(12) United States Patent
De Smet

(10) Patent No.: US 6,408,252 B1
(45) Date of Patent: Jun. 18, 2002

(54) CALIBRATION SYSTEM AND DISPLACEMENT MEASUREMENT DEVICE

(75) Inventor: Pierre De Smet, Bloomfield Hills, MI (US)

(73) Assignee: Dynalog, Inc., Bloomfield Hills, MI (US)

( * ) Notice: Subject to any disclaimer, the term of this patent is extended or adjusted under 35 U.S.C. 154(b) by 0 days.

(21) Appl. No.: 09/463,538

(22) PCT Filed: Jul. 31, 1998

(86) PCT No.: PCT/US98/15739

§ 371 (c)(1),
(2), (4) Date: Jan. 27, 2000

(87) PCT Pub. No.: WO99/06897

PCT Pub. Date: Feb. 11, 1999

Related U.S. Application Data

(60) Provisional application No. 60/054,513, filed on Aug. 1, 1997.

(51) Int. Cl.⁷ .......................... G01P 21/00; G05B 19/00
(52) U.S. Cl. .......................... 702/94; 702/163; 700/254
(58) Field of Search .......................... 702/87, 94–95, 702/97, 150, 152, 153, 163; 700/245, 254, 258, 262; 901/15, 40; 318/568.11, 568.12, 568.13

(56) References Cited

U.S. PATENT DOCUMENTS

| | | | | |
|---|---|---|---|---|
| 4,535,405 A | * | 8/1985 | Hill et al. | 702/151 |
| 5,392,384 A | * | 2/1995 | Tounai et al. | 700/254 |
| 5,535,306 A | * | 7/1996 | Stevens | 700/254 |
| 5,642,298 A | * | 6/1997 | Mallory et al. | 702/117 |
| 5,687,293 A | * | 11/1997 | Snell | 318/568.13 |

* cited by examiner

Primary Examiner—Bryan Bui
(74) Attorney, Agent, or Firm—Gifford, Krass, Groh, Sprinkle, Anderson & Citkowski, P.C.

(57) ABSTRACT

An improved system (20) for the calibration of a robot system. The system (20) comprising a linear displacement measurement device (32) in conjunction with a robot calibration system. The linear displacement measurement device (32) comprising an elongated member (34), a drum, a shaft, a drum displacement mechanism and a drum rotation sensor. The drum is displaced axially upon the shaft as the drum rotates when the elongated member (34) is moved. The drum rotation sensor provides accurate information regarding the distance the elongated member (34) travels. The displacement measuring device (32) is used in an iterative manner with the calibration system (20) for the purpose of the calibration of a robotic device (22).

9 Claims, 3 Drawing Sheets

CALIBRATION SYSTEM AND DISPLACEMENT MEASUREMENT DEVICE

CROSS REFERENCE TO RELATED APPLICATION

This application is based on Provisional Application No. 60/054,513 filed on Aug. 1, 1997.

BACKGROUND OF THE INVENTION

1. Field of the Invention

The present invention relates to a robot calibration system with a linear displacement measuring device.

2. Description of the Related Art

There are many known calibration systems for improving the positional accuracy of an industrial robot which are based upon a kinematic model of the robot. The movement of a single robot is controlled by algorithms executed within the processor for the robot (the robot's "controller"). These algorithms are based upon a mathematical model of the robot's geometry based on ideal, nominal parameters (ie. length of each link, twist angles between links, etc). However, the actual parameters (also known as "as built" parameters) of an individual industrial robot differ from the nominal ones due mainly to tolerances applied to each component in both the machining of components, sub-assembly of components, and final assembly of an industrial robot. Consequently, each individual robot of the same production model generally possesses a set of actual/"as built" parameters.

Therefore, a loss of "absolute robot positional accuracy" results, for example, when programming an individual industrial robot "off-line" (ie. programming by indicating Cartesian coordinates for a desired robot position rather tan driving the robot to that desired position), due to use of the nominal parameters of the robot (instead of the "as built" parameters) by the robot controller: the robot does not actually achieve the commanded Cartesian coordinates of position in space desired by the robot operator/programmer.

The process of identifying the set of actual/"as built" parameters associated with an individual industrial robot is often referred to as "robot calibration". There are a number of different known methods which then use these actual/"as built" parameters, versus the nominal ones, to modify the positions in a prouction robot program to improve the robot's positional accuracy.

More specifically, due to the improved positional accuracy, robot calibration techniques permit the following operations to be performed without modification of robot positions by the robot operator/programmer (a process referred to as "touch up"): (1) programming of the robot "off-line" using a PC or workstation-based simulation software product; (2) restoring production robot programs following a collision between a robot and another entity (after regarding-calibration of the robot); and (3) transferring robot programs from one robot to another (ie. compensating for "as built" parameters of each robot which have been identified in the process of calibrating each robot).

The prior art systems for the calibration of a robot generally accomplish their functions by means of executing calibration robot programs on the robot controller which instruct the robot to move through a series of positions in its operational space while being monitored by a measurement device which is capable of determining the three dimensional location (ie. x, y, z location in a particular Cartesian coordinate system) of a point (often referred to as the Tool Center Point or TCP) of the end effector of the subject robot. In some cases, the measurement system provides more or less degrees-of-freedom but typically such measurement systems report measurement data in some type of "Cartesian" (or linear) format (e.g. 2-dimensional, 3-dimensional, or 6-dimensional).

Among all prior art systems, the purpose of the calibration procedure is to collect information concerning deviation between the actual (as identified by the measurement system) robot position achieved at each position in the calibration robot program and the corresponding commanded robot positions and then use that information to "deduce" or calculate the actual/"as built" parameters (ie. the differences between the "actual" robot and the "nominal" robot parameters). Typically the prior art systems used 3-dimensional or 6-dimensional measurement systems that include, for example, theodolites, laser interferometers, and camera/photogranmmetry systems.

In one known prior art system (the RoboTrack System distributed by Robot Simulations Ltd.) three measurement cables are secured to the end of the robot arm. The other end of each of the measurement cables is connected to a linear displacement measurement device which measures the extension and retraction of the cable due to the movement of the end of the robot arm. The linear displacement measurement devices are positioned at various known locations around the robot's operational envelope. Once the measurement cables have been connected to the robot, the displacement devices at each robot position measure the distances between the position achieved by the robot arm and the displacement devices. Using triangulation and other mathematical algorithms, the 3-dimensional position (x, y, z in a single Cartesian coordinate position) of the end of the robot arm and the end effector can be determined based upon the linear displacement data which is gathered from each of the measurement devices. This prior art system has numerous problems and in fact is generally only found in non-commercial facilities. Furthermore, this prior art system depends upon the accuracy of the 3-dimensional positional information, which means by nature of the triangulation process that the positional information "degrades" in several portions of the robot's operational envelope (particularly at the boundaries of such operational envelope). Therefore, in some instances, in fact, the absolute positional accuracy of the robot was not improved but rather worse than before the calibration procedure was performed with this prior art system.

Moreover, in addition to the restrictions upon overall accuracy of this prior art system attributable to triangulation and use of this "derived" 3-dimensional data, the linear displacement measurement devices themselves restricted measurement accuracy due to inherent design flaws. For example, each measurement cable of this prior art system exits the housing of the linear displacement measurement device at various angles/attitudes through a hole. By definition, as the cable can simply not bend at a "sharp" angle, the "rounding" of the cable when making contact with the edge of the exit hole contributed to error in the measurement data. Furthermore, this prior art system does not contain a design element to defeat overlap of the measurement cable as it retracts into the housing. This design issue concerning overlap contributes significantly to overall system error as the length of the cable extended is calculated based upon the assumed known and constant radius of the drum upon which the measurement cable retracts.

Other prior art systems have tried to overcome the overlap issue by employing a groove on the drum to force the cable to wind sequentially on the drum. However, as this groove method requires "spacing" on the drum surface, the groove method naturally restricts the amount of measurement cable which can be held by each linear displacement device, and consequently restricts the amount of the robot's operational envelope in which measurements can be recorded. Finally, the groove method does not prevent cases in which the cable "jumps" out of one groove and rests on top of another portion of the drum at unpredictable intervals.

One prior art system avoids any cable issue entirely and the cable itself by employing a radial-distance linear transducer referred to in the art as (an LVDT or "ball-bar") instead, that is often referred to as the telescopic ball-bar system. The ball-bar mechanism of this prior art system has a magnetic chuck permanently mounted at one end, and a removable high precision steel ball mounted at the opposite end. Extension bars permit the nominal length of the ball-bar to be increased in order to reach more of the robot's operational envelope, but these extension bars add significant weight (and corresponding force) at the measurement point and therefore degrade the accuracy of the measurement data recorded with the LVDT mechanism.

The inventors of this prior art system state that ideally this prior art system would require use of six ball-bars in order to completely identify the robot endpoint pose at every posture. However, this prior art system alternatively permits, although the process is cumbersome, the operator to "serialize" the procedure by commanding the robot to travel on a spherical shell while only one ball-bar is connected between its end point and table. This alternate procedure must be repeated six times while interchanging the connections between the three balls and three magnetic chucks in six appropriate combinations. In this way, this prior art system allows collection of the necessary measurement data with a single ball-bar at the cost of extra time. Such extra time is a premium price to pay in the kind of production environment in which robot systems are typically deployed.

In fact, the inventors of this prior art system state that the limited reach of the ball-bar substantially restricts the positional freedom that can be achieved during the calibration process. This restriction upon the size of the measurement envelope of this prior art system is the basis for the requirement that the operator mount at least three (preferable six) magnetic chucks within the robot's operational envelope in order to record robot position measurements in as large an area as possible. Unfortunately, the requirement that a plurality of magnetic chucks be employed prevents use of this prior art system to perform robot calibration automatically (ie. without robot operator/programmer intervention).

This prior art system developed utilizes a rotatable drum about which the measurement cable is coiled. As the cable extends and retracts from the measurement device, the drum rotates. An optical encoder measures the rotational movement of the drum in order to determine the linear displacement of the end of the cable. The cable is coiled a plurality of times around the drum, extends at least partially around a first pulley, at least partially around a second pulley positioned adjacent to the drum and extends out of the housing of the device to a first end which is secured to the end of the robot arm or robot end effector. These pulleys have a known radius, and eliminate the problem of the cable exiting through a hole at different angles, although they add some inherent complexity in the measurement process, since the measurement cable length no longer represents a straight line from one point to the other. Knowing the circumference and rotational displacement of the drum, the linear displacement of the measurement cable can be calculated. As indicated above, in order to insure accuracy, it is imperative that the cable be wound in a single layer on the outer surface of the drum (ie. no "overlap"). If the cable overlaps itself on the drum, the effective outer circumference about which the cable is coiled will be increased. The result of this situation would be a reduced rotational displacement about the drum when the cable is either extended or retracted, thereby providing inaccurate information concerning measurement cable displacement.

The design element employed by this prior art system of the present inventor consists of spacing the first pulley a sufficient distance from the drum (that distance being a function of the cable thickness and the number of coils about the drum). This distance must be sufficient such that the angle at which the cable comes on the drum is shallow enough (so that it is nearly always perpendicular to the drum)—to insure that, as the cable is wound onto the drum, the thickness of the cable itself prevents the cable from overlapping. However, this increase the size of the displacement measurement device itself, proportionally to the amount of coils around the drum.

Several years ago the inventor of the present invention developed the following prior art system which included design elements which resolve these measurement cable issues. Two such linear displacement measurement devices were located at a fixed, known distance one relative to the other on a single mounting surface approximately 1500 mounting member in length. Although one end of each of the two measurement cables is coiled on a drum, the other ends of the cables are free to extend in 3-dimensional space. Using the known, constant distance between the two linear displacement measurement devices, this prior art system converts the two linear measurements into a 2-dimensional position (ie. an x, y position in a single Cartesian coordinate system) using triangulation. As a result, this prior art system exhibits some "degradation" of the converted measurement data, similar to the previously discussed prior art system which employs three linear displacement devices to report 3-dimensional position information.

It is an object of the present invention to provide a calibration system which accurately identifies robot, end-effector, and fixture parameters using 1-dimensional multi-directional data directly and does not require conversion to Cartesian (e.g. 2-dimensional xy data or 3-dimensional xyz data). It is a further object of the present invention to provide a linear displacement device offering high accuracy measurements by preventing cable overlap with a compact design, and a large measurement volume by increasing the amount of measurement cable which the linear displacement device can accommodate with minimal increase in the overall size of the linear displacement device itself.

While the foregoing drawings, description, and discussion show some specific embodiments in the invention, yet other variations thereof will be apparent to one of sill in the art. For example, the cable assembly which is used to generate the one dimensioned position signal may be replaced by any other system which can generate a signal in response to linear displacement. Such other systems include optical, mehcanical, or electronic encoders, and the one-dimensional position signal can be processed in accordance with the method of this invention to measure displacement of the robot end point.

SUMMARY OF THE INVENTION

The present invention provides an improved device for calibration of a robot system including a linear displacement measurement device that accurately identifies robot, end-effector, and fixture parameters using 1-dimensional multi-directional data directly. In the primary embodiment, the linear displacement measurement device comprises a housing, an elongated member, a drum, a shaft, a rotation sensor, a means for moving the drum axially with respect to the shaft as the elongated member is wound about the drum, a set pulleys to guide the elongated member and a system for determining the distance traveled by the elongated member. The shaft is rotatably mounted in the housing. This arrangement ensures that the elongate member is wound about the drum in a single layer without overlapping itself. The shaft (on which the drum is mounted) rotates together with the drum, allowing mounting of a rotation sensor to the shaft. This sensor thus measures the true rotation of the drum. The information derived from this system determines the linear displacement of the elongated member. The linear displacement measurement information provided by the linear displacement measurement device is used in conjunction with the calibration system software to perform calibration of a robot system.

Unlike the prior art systems, the present invention improves the accuracy of the robot parameters identified in the calibration process, reduces the number of linear displacement measurement devices required to gather data, allows calibration based on one dimensional data, eliminates variability of data which is present in non-pulley devices and reduces the size of the displacement measurement device.

DETAILED DESCRIPTION OF THE PREFERRED EMBODIMENT

Figure 1:
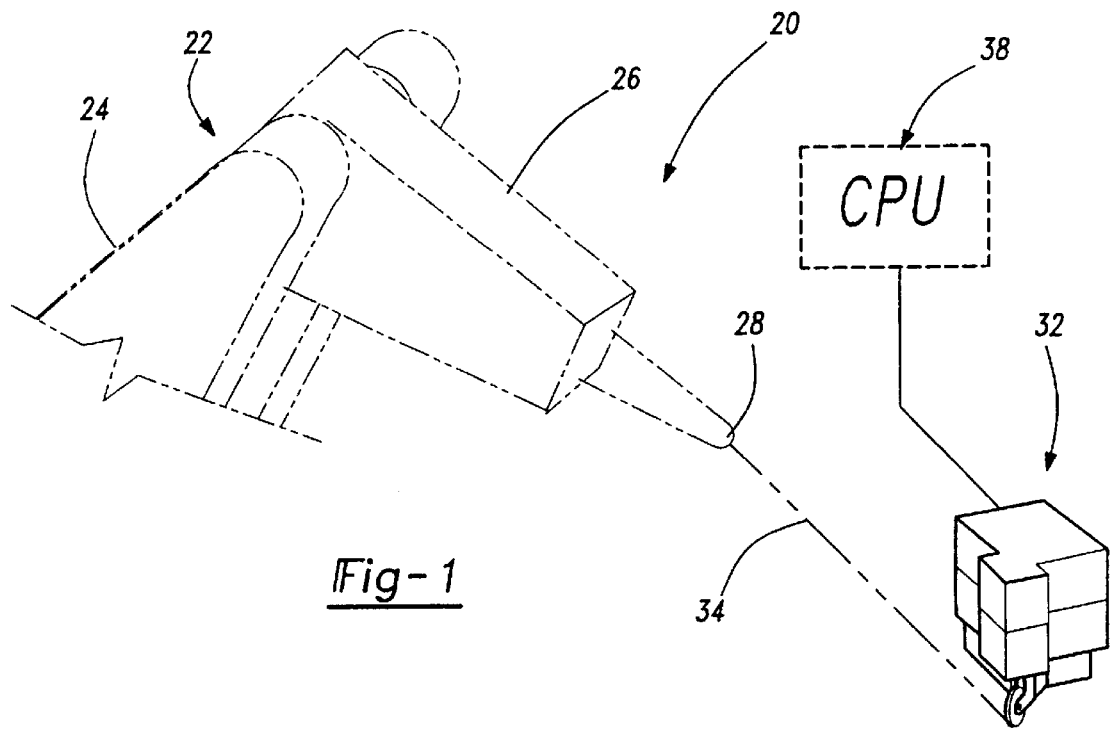
FIG. 1 illustrates the relationship of the calibration device with a generic robotic arm.

The calibration system, 20, of the present invention is shown generally in FIG. 1 as used to perform calibration of an industrial robot, 22, with a displacement measuring device, 32. The robot, 22, comprises a plurality of hingeably connected arms, 24 and 26. The robot, 22, would typically include an end effector, 28, which might be a tool or some other device which may be attached to and manipulated by the robot, 22.

The displacement measuring device 32 comprises an elongated member (also referred to as a cable or filament), 34, extending therefrom and secured to the end effector, 28. In other embodiments, the elongated member may also be attached to other points on the robot. In an alternate embodiment, more than one displacement measuring device may be employed to gather the information required to calibrate a robot. The measurements from the measurement device(s) 32 are sent to a CPU 38. The measurement device, 32, measures the distance between the measurement device 32 and the end effector, 28, of the robot, 22. The calibration robot program not shown, associated with the robot, 22, instructs the robot to move, thus moving the end effector, 28, to a plurality of locations in space which are known as the "calibration positions". The measurement device, 32, determines the actual distance from the displacement measuring device, 32, to each "calibration position" as a result of the filament, 34, being pulled out of the measurement device, 32, or being retracted into the measurement device.

The calibration software located on the CPU, 38, first calculates (1) the approximate location of the displacement measurement device, 32, relative to the robot, 22, (known as the "measurement device location") as well as (2) the approximate location of the measured point on the end effector, 28, to which the end of the filament, 34, is attached relative to the end of the arm, 26 (known as the "measurement point location"). The calibration software then uses the nominal parameters of the robot, 22 (e.g. nominal dimensions of the arms, 24 and 26, ) together with the relative position of the arm, one relative to the other, as extracted from the calibration robot program, to calculate the position of the end of the robot, 22 (ie. the end of arm, 26, also known as the flange) relative to its base coordinate frame (attached to the floor).

Combining that information with the previously obtained approximation of the "measurement device location" and the "measurement point location", the calibration software then finds a first estimate of the distance between the displacement measurement device, 32, and the measured point on the end effector, 28 known as the "calculated distance" instead of employing a triangulation method to reduce the data to Cartesian or linear information.

For each of the "calibration positions", the calibration system software compares the calculated distance with the measured distance provided by the displacement measurement device, 32. The difference is expressed as a function of the identified calibration parameters the robot geometry parameters, including but not limited to the Tenavit-Hartenberg parameters but also the displacement measurement device location and the measurement point location). Through minimization of these differences, a modified set of calibration parameters can be calculated, and used to calculate a new estimate of what the calculated distance should be at each "calibration point". This process is repeated until the values are within a minimumization limit (also known as "convergence"). This "convergence" means that the actual parameters of the robot, 22, have been obtained. With this information, the robot position data in robot programs to be executed by the robot control software can be adjusted accordingly to compensate the control commands for the robot, 22, so that the end effector, 28, arrives very closely to the correct (ie. the intended) position in space.

Figure 2:
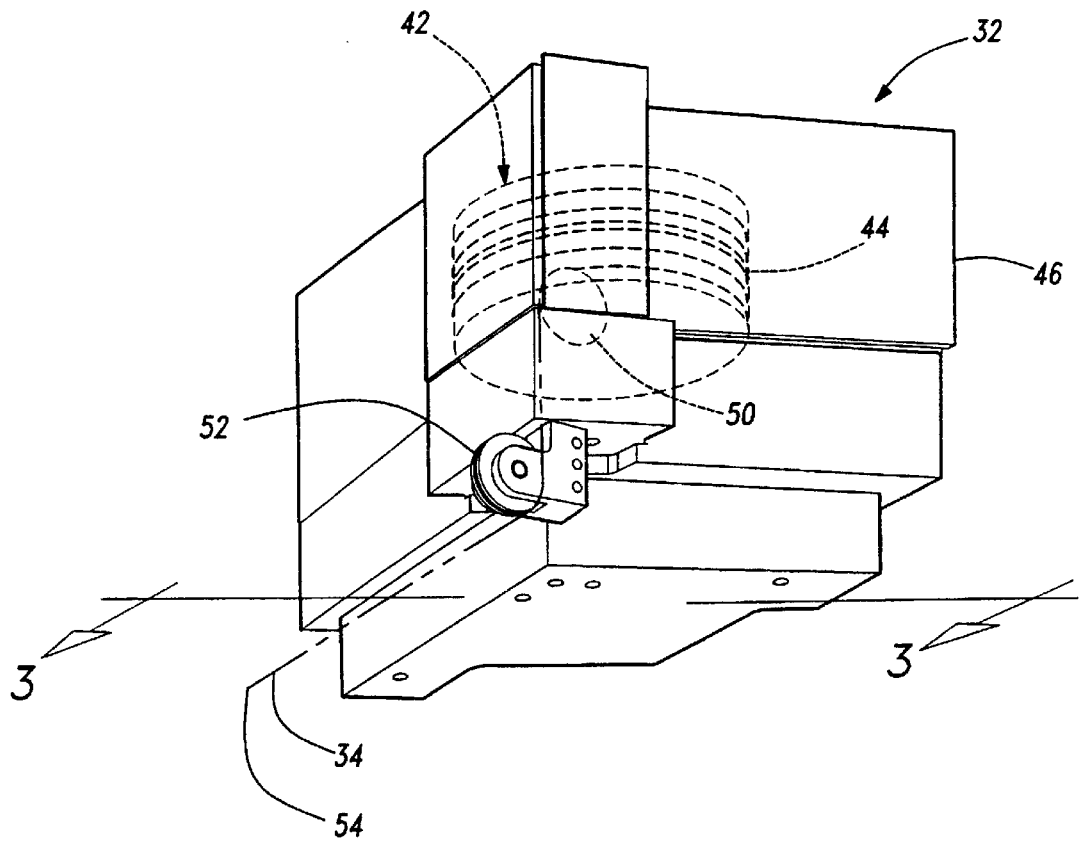
FIG. 2 is a perspective view of the measurement device of FIG. 1.

FIG. 2 illustrates the measurement device, 32, of FIG. 1. The linear displacement measurement device, 32, includes a drum, 42, having an outer cylindrical surface, 44, about which the elongate member, 34, is wound. The drum 42 is rotatably and translationally mounted in a housing 46 of the measurement device 32. The elongated member 34 is at least partially wound about the outer cylindrical surface 44 of drum 42. The elongated member, 34, then extends at least partially around a first pulley 50 and further extends at least partially around a second pulley 52. That pulley 52 is also free to rotate around an axis that coincides with the line formed by the cable coming from pulley 50 to pulley 52. An end, 54, of the elongated member, 34, extends from the second pulley 52 and is connected to the object (in this case end effector 28) whose displacement is to be measured.

Figure 3:
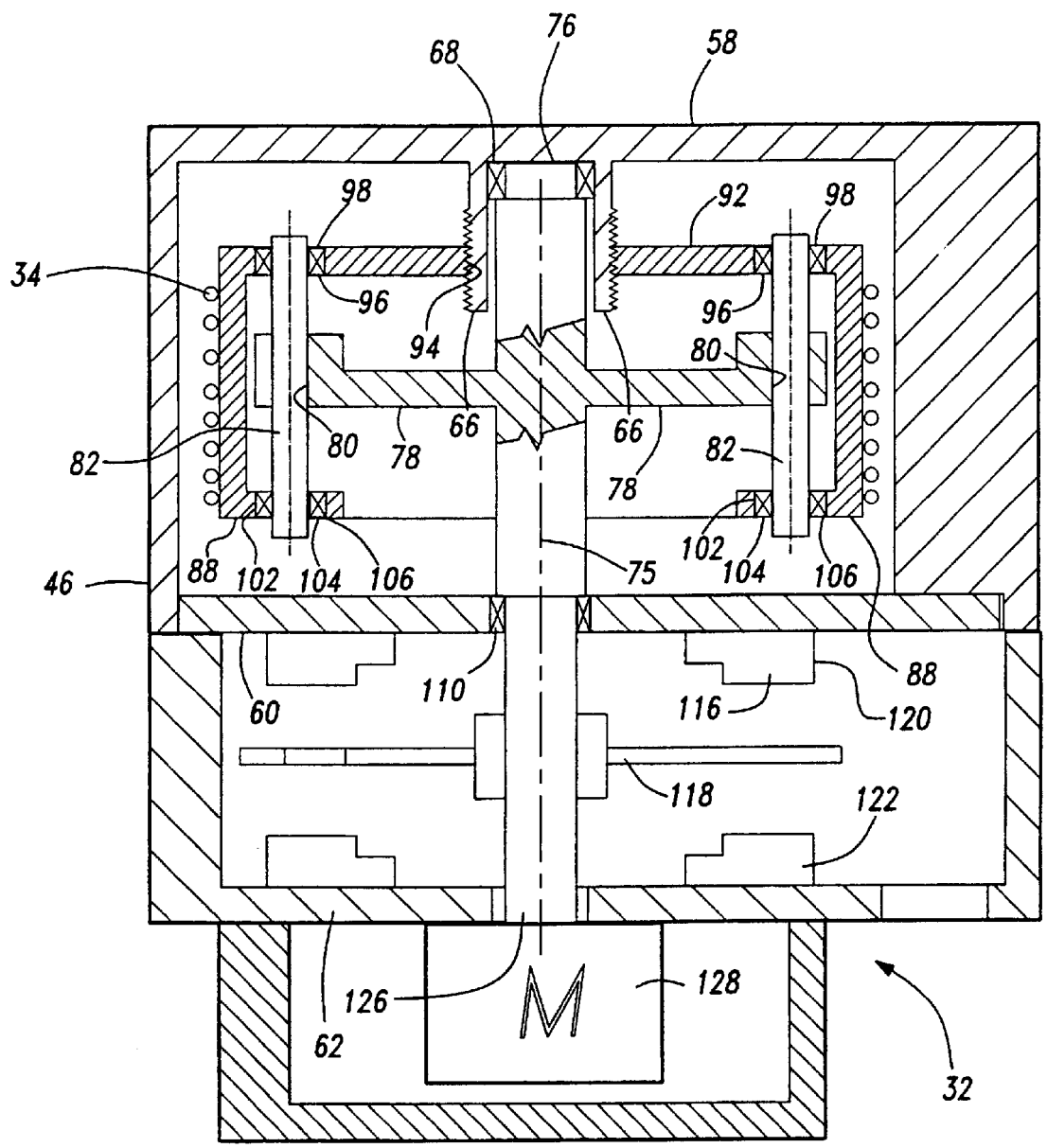
FIG. 3 is a cross section along line 3—3 of FIG. 2.

A sectional view of the measurement device 32 is shown in FIG. 3. The housing 46 includes a full bottom wall 58, a generally parallel intermediate wall 60 and a generally parallel top wall 62. An annular, externally threaded member 66 extends upwardly from the top wall 58. A bearing 68, concentric with the externally threaded member 66, is also mounted in the bottom wall 58. Another bearing 110 is mounted on the intermediate wall 60.

A shaft 74 extending along an axis 75 is rotatably supported at a first end 76 by the bearing 68 and the bottom wall 58 and by the bearing 110 in the intermediate wall 60. A pair of opposed arms 78 extend from the shaft 74. The arms 78 are integral with the shaft 74. Each arm 78 includes an aperture 80 which is parallel to the axis 75 and at the outer end of each arm 78. A pin 82 is fixedly mounted within each aperture 80 parallel to axis 75.

The drum 42 includes a cylindrical wall 88 centered about axis 75. The bottom wall 92 of drum 42 extends radially inwardly from the bottom end of the cylindrical wall 88. The bottom wall 92 includes a threaded aperture 94 centered on axis 75 and threadably engaging the externally threaded member 66. The bottom wall 92 of the drum 42 further includes a pair of diametrically opposed apertures 96 radially spaced from the threaded aperture 94. A linear bearing 98 is mounted in each aperture 96. The top wall 102 extends radially inwardly from the top end of the cylindrical wall 88 of the drum 42. Linear bearings 104 are similarly mounted in aperture 106 in the top wall 102. As can be seen in FIG. 3, the pins 82 are disposed in apertures 96 and 106. The linear bearings 98 and 104 permit axial movement of the drum 42 relative to pins 82 and shaft 74, but there is not relative rotation between the pins 82 and the drum 42.

In the present embodiment of the invention, an optical encoder 116 measures rotational movement of the shaft 74. The stator portion (including the necessary electronics, not shown) is mounted to the intermediate wall 60. In the primary embodiment of the invention, the rotator portion of the optical encoder 116 is a rotating glass plate 118 which is fixedly mounted to the shaft 74. A light emitting diode 120 and receiver 122 are fixedly mounted to the intermediate wall 60 and the top wall 62 respectively of the housing 46. Indications (not shown) on the glass plate 118 intermittently block light from the light emitting diode 120 from being received by the receiver 122. The number of pulses are directly proportional to the rotational displacement of the glass plate 118 and therefore shaft 74 and drum 42. In alternative embodiments, any of a variety of other known devices for measuring rotational displacement can also be used such as mechanical sensors, visual systems and other means including but not limited to laser devices, potentiometers and resolvers.

The second end 126 of shaft 74 is secured to the rotor portion of a spring motor 128 which rotationally biases the shaft 74 in one rotational direction in order to take up any slack in the cable 34. The stator portion of the spring motor 128 is connected to the top wall 62.

Figure 4:
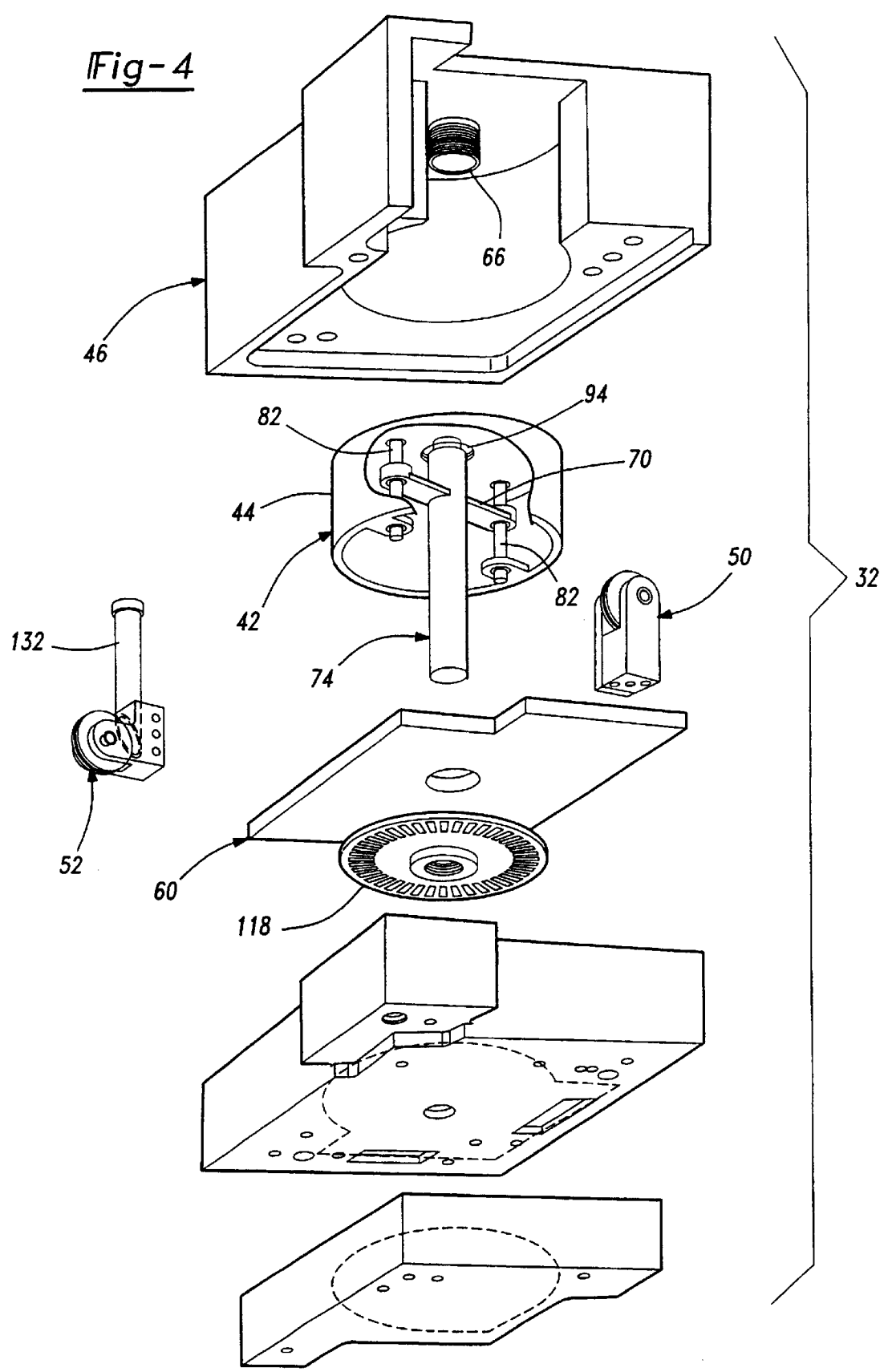
FIG. 4, an exploded view of the measurement device of FIG. 2.

Referring to FIG. 4, the elongated member 34 is coiled at least partially about the outer surface 44 of the drum 42. The elongated member 34 passes at least partially around the first pulley and through a hollow pivot pin 132 which is rotatably supported in housing 46. The second pulley 52 is mounted to the pivot pin 132, thereby permitting the second pulley 52 to pivot relative to the housing 46.

In operation, as the elongate member is extended or retracted from the measurement device 32, the drum 42 rotates. The rotational movement of the drum 42 is measured by the optical encoder 116. Knowing the circumference of the drum 42, the linear displacement of the cable 34 can be calculated. The angle of the elongated member 34 as it leaves the second pulley 52 is obtained iteratively from angle sensors in the robot while calibrating the robot 22, and thus also the measurement device location through the calibration software in the CPU, 38. As the elongated member 34 is extended and retracted from the device 32, the drum 42 is moved axially in order to wind the elongated member 34 in a single layer on the outer surface 44 of the drum 42. The threaded engagement of the externally threaded member 66 and the threaded aperture 94 of the drum 42 causes axial movement of the drum 42 relative to the housing 46 proportional upon rotation of the drum 42. The particular thread size preferably matches or is slightly greater than the thickness of the cable 34. As a result, overlap of the elongated member 34 is prevented and accuracy of the measurement is ensured.

This detailed description of the invention does assume the displacement measurement device, 32, to be located at one generally unknown position relative to the robot, 22. Also, the end of the elongated member, 34, is at one originally unknown position relative to the end of the arm, 26. These originally unknown parameters are calculated together with the actual robot geometry parameters through the calibration software.

In an alternate embodiment, the displacement measurement device can be placed at a minimum of three location on a single fixture holding a production part, these different locations being accurately known with respect to one common coordinate frame. In such an embodiment, the calibration system software of the present invention will identify the mathematical relation in six degrees of freedom between that common coordinate frame and the frame attached to the end of the arm, 26.

In yet another embodiment, the end of the elongated member, 34, can be attached to a minimum of three locations on an end effector which holds a production part in a plurality of orientations during an operation performed by a "stand-alone" tool such as a pedestal spot weld gun. If these locations on the end-effector are known with respect to one common coordinate frame, the calibration system software of the present invention will identify the mathematical relation in six degrees of freedom between that common coordinate frame and the robot base frame.

In contrast to the prior art calibration systems, the present invention eliminates: (1) the need for more than one dimensional from the linear displacement measurement device; (2) the need to mount the measurement device in a plurality of locations in order to perform robot calibration; and (2) the requirement that the calibration robot program be taught off-line. Furthermore, the present invention offers a large measurement envelope while only exerting nearly negligible force at the measurement point thus increasing overall accuracy of robot parameters identified in the calibration process. Finally, in light of the fact that the present invention only requires that the linear displacement measurement device be mounted in a single location, which may be permanent, the present invention may be combined with an automated attachment mechanism which will allow calibration to occur without robot operator/programmer intervention.

Having described my invention, additional preferred embodiments will become apparent to those skilled in the art to which it pertains without deviating from the scope of the appended claims:

I claim:

1. A displacement measuring device for a robot having an end-point, said measuring device comprising;

a housing;

an elongate shaft mounted within said housing;

a drum having a central axis, a central throughhole extending along said central axis through said drum and capable of accepting the shaft, the drum being mounted on the shaft and the drum having a generally cylindrical outer surface;

a elongate member having a fixed width, a first end and a second end, the first end attached to the outer surface of the drum and the second end attached to the end-point, the elongate member being coilable about the drum;

displacement means for displacing the drum in a direction along said central axis relative to the coiling of the elongate member about the drum thereby preventing the elongate member from overlapping itself; and rotation measuring means for measuring the rotation of the drum about the drum central axis, whereby the rotation of the drum is translated into the linear displacement of the elongate member and thusly the distance from the measuring device to the end-point.

2. A displacement measuring device as described in claim 1, wherein:

said drum has an inner cylindrical surface containing a threaded surface;

said shaft having a threaded exterior threadably engaging the drum inner cylindrical surface so as to displace the drum axially relative to said elongate member coiling about the drum.

3. A displacement measuring device as described in claim 1, wherein:

said rotation measuring means further comprising an optical encoder having an outwardly projecting and planar surface fixedly mounted to said shaft, a transmitter mounted to said housing above the optical encoder first side, a receiver mounted in said housing and aligned opposite the transmitter and aligned therewith, the optical encoder oriented between the transmitter and the receiver whereby the rotation of the drum rotates the optical encoder, thereby causing a disruption of the signal from the transmitter, which causes the receiver to generate a signal indicative of the displacement of said elongate member.

4. A displacement measuring device as described in claim 1, wherein:

said rotation measuring means is a mechanical measuring device.

5. A displacement measuring device as described in claim 1, wherein:

said elongate member is a cable.

6. A displacement measuring device as described in claim 1, wherein:

said elongate member is a filament.

7. A displacement measuring device as described in claim 1, further comprising:

a robot calibration means.

8. A calibration system for a robot having predetermined parameters and an end-point, comprising:

a housing;

an elongate shaft mounted within said housing;

a drum having a central axis, a central throughhole extending along said central axis through said drum and capable of accepting the shaft, the drum being mounted on the shaft and the drum having a generally cylindrical outer surface;

a elongate member having a fixed width, a first end and a second end, the first end attached to the outer surface of the drum and the second end attached to the end-point, the elongate member being coilable about the drum;

displacement means for displacing the drum in a direction along said central axis relative to the coiling of the elongate member about the drum thereby preventing the elongate member from overlapping itself;

rotation measuring means for measuring the rotation of the drum about the drum central axis;

a means for determining the displacement of the elongate member, and a robot calibration means.

9. A calibration system for a robot as described in claim 8, wherein the calibration means comprises the steps of:

storing a mathematical model of said robot, storing a minimumization limit value, storing a calibration data structure having a predetermined number of elements, each of said data structure elements containing a nominal distance, a measured distance, an equation expressing the element as a function of the robot parameters and a minimumization value;

perform iteratively until the calculated minimumization values in said calibration data structure are within said minimumization limit value;

a. performing iteratively for each calibration data structure elements;
 i. instructing said robot to move said end-point to a predetermined location,
 ii. determining the measured distance, the measured distance being the linear distance displaced by said elongate member attached to said end-point;
 iii. storing said measured distance in said calibration data structure;
 iiii. calculating the difference between the measured distance and the nominal distance;

b. determine the minimumization value for each calibration data structure element.

* * * * *